Oct. 5, 1937.  H. FRINGS  2,094,592
APPARATUS FOR THE PRODUCTION OF VINEGAR
Filed July 23, 1936
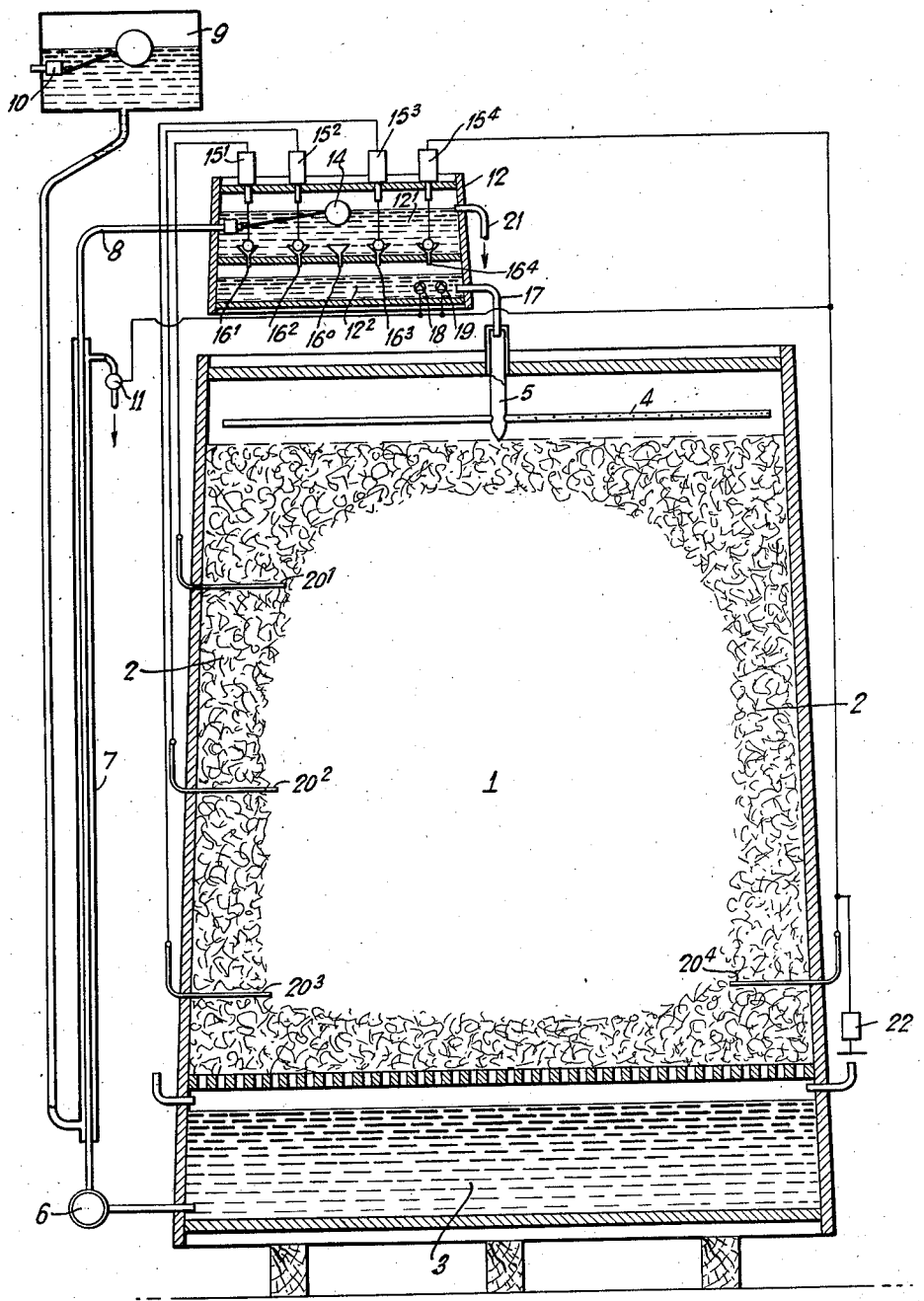
INVENTOR
HEINRICH FRINGS
BY
Watson, Bristol, Johnson & Leavenworth
ATTORNEYS Patented Oct. 5, 1937

2,094,592

UNITED STATES PATENT OFFICE 2,094,592

APPARATUS FOR THE PRODUCTION OF VINEGAR

Heinrich Frings, Bonn-on-the-Rhine, Germany, assignor to Standard Brands Incorporated, New York, N. Y., a corporation of Delaware Application July 23, 1936, Serial No. 92,162
In Germany November 22, 1935

11 Claims. (Cl. 99—245)

The invention relates to an apparatus adapted for utilization in the manufacture of vinegar. More particularly, it relates to a vinegar producing apparatus in which the rate of flow and the temperature of the infusion or wort are regulated and includes correlated improvements and discoveries whereby such regulation may be effected.

An object of the invention is to provide an apparatus for vinegar manufacture which is provided with temperature-responsive elements whereby the flow and temperature of the infusion or wort are regulated in accordance with the conditions pertaining in the vinegar generator.

Another object of the invention is to provide a vinegar making apparatus in which the flow of an oxidizing gas, as air, is controlled in accordance with the operating conditions within the generator by means of a temperature-responsive element positioned in the generator filling.

A further object of the invention is to provide an apparatus in which vinegar may be manufactured readily, economically, and efficiently on a commercial scale and in relatively large generators.

A more specific object of the invention is to provide a vinegar making apparatus having a circulatory flow of the infusion or mash which includes a container having electro-magnetic valves for controlling the flow of the infusion, which valves are operated by temperature-responsive elements positioned within the generator.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

According to the present invention an apparatus for the production of vinegar in relatively large vinegar generators, is operated with circulation, with automatic regulation of the infusion temperature, and, if desired, also of the quantity of the infusion or mash, by temperature-responsive elements, as contact thermometers or the like.

In the practice of the invention there is provided in the path of circulation of the mash, in addition to a cooler, an intermediate container for the purpose of regulating the temperature and pressure of the infusion liquid, into which one or more temperature-responsive elements, as contact thermometers or the like are inserted, which regulate the amount of water flowing into the cooler by actuating one or more valves located in the inflow or outflow ends of the water line.

Regulation of the quantity of infusion may take place at the same time as the regulation of the infusion temperature. For this purpose, valves for the regulable outflow of the wort or mash in the vinegar generator are provided in the above mentioned intermediate container, the setting of the valves being accomplished by electromagnets. The latter are actuated by contact thermometers inserted at different heights in the charge of shavings. One or more of the thermometers inserted in the shavings may regulate the quantity of mash by means of one or more mash-valves, as well as regulate the temperature of the mash by means of one or more valves provided in the water line, or, according to an additional mode of operation, cooperate with the contact thermometer inserted in the container, in such manner that merely regulation of the infusion temperature is accomplished without simultaneous regulation of the quantity of infusion. Furthermore, the contact thermometers in the shavings of the generator may regulate the current of oxidizing gas, as air, which serves to oxidize the alcohol content of the mash by actuating electro-magnetically operated air inlet valves.

An illustrative embodiment of the invention is shown diagrammatically on the attached drawing, in which:

1 designates a vinegar generator, 2 a filling of shavings, 3 a collecting chamber, 4 an infusion chamber with a rotating spray 5, 6 a pump producing the circulation, 7 a mash cooler and 8 a feed line.

For charging cooler 7 with cooling water, a water container 9, with built-in float valve 10, is located at a suitable height, so that the water flows to the cooler under constant, comparatively low pressure. An electro-magnetically operated water valve 11 is located at the outlet of the cooler, and with the low water-pressure prevailing, requires little power for its operation. Under certain conditions the attachment of several such valves may be useful; the water supply is then operated stepwise.

A small container 12 is located between the feed line 8 and the rotating spray 5 in the path of the circulating mash. In addition to the cover board and the bottom board, this container is equipped with a median partition. Two separate partial containers are thereby produced, namely, the upper, larger one $12^1$ and the lower, smaller one $12^2$. The level of the mash pumped into the upper container is kept the same by means of a built-in float valve 14. In the cover board of the vat, several electro-magnets are provided. The drawing shows four, namely $15^1$, 15², 15³, and 15⁴. Vertically below them there are, in the central partition, funnel-shaped outlets 16¹, 16², 16³, and 16⁴, which are opened or closed by ball-shaped valve bodies, suspended from chains and operated by the corresponding electro-magnets, and accordingly, allow or stop the flow of mash from the upper container 12¹ into the lower container 12². Because of the very slight pressure of the liquid acting upon them, the actuation of valves 16¹ to 16⁴ requires only a slight magnetic pull. The outlet funnels 16¹ to 16⁴ are accurately calibrated, and are adjustable, so that very definite, but changeable amounts of mash may flow through them. In addition to these outlet funnels there is a like outlet funnel 16⁰ located in the same partition, which operates without a valve and always allows a certain minimum amount of mash to flow through, so far as the pump is moving mash to any extent. The lower chamber 12² of container 12 is equipped with an outlet pipe 17 for rotating spray 5, and one or more contact thermometers 18 and 19 near the outlet.

Several contact thermometers 20¹, 20², 20³, and 20⁴ are inserted at different heights in the shaving charge 2 in the generator. These contact thermometers are connected by means of electric lines with electro-magnets 15¹, 15², 15³, and 15⁴. Furthermore, a connecting line runs from contact thermometer 20⁴, via contact thermometer 19 to water valve 11.

The fresh mash introduced into collecting chamber 3, and whose temperature usually is below that of contact thermometers 18 and 19 is conveyed by pump 6 through cooler 7 preferably counter-current to the cooling water, and pipe line 8 into container 12 and by means of float valve 14 is adjusted to a constant level. Valves 16¹ to 16⁴ are closed first. The mash therefore first flows through outlet funnel 16⁰ into the lower part 12² and through pipe line 17 into rotating spray 5. The warm vinegar flowing from the charge of shavings soon raises the temperature of the circulating mash until the highest infusion temperature allowable, X°, for which contact thermometer 18 is adjusted, is reached. Contact thermometer 18 now stops the stream and thereby opens water valve 11, so that cooling water from water pressure regulator 9 flows through cooler 7 and cools the mash. The temperature of the circulating mash is thereby rapidly reduced below X°, so that the contact at thermometer 18 is broken and the flow of cooling water through cooler 11 is throttled. That is, cooled and uncooled mash flows in alternation into container 12, which is made so large that sufficient admixture of cooled and uncooled infusion liquid takes place. This equalization of the temperature has the effect that the mash flowing through pipe 17 into the rotating spray, shows only very slight temperature fluctuations, which, however, suffice for actuating contact thermometer 18.

The increasing vinegar fermentation soon causes the temperature of the charge of shavings to rise. As soon as thermometer 20¹ has reached a temperature of $a^1$ degrees, it closes the circuit of electro-magnet 15¹, which opens valve 16¹ and allows an accurately measured, additional amount of mash to flow into container 12², and hence out through the rotating spray. When thermometer 20², mounted lower, about in the center of the charge of shavings, has reached the optimum temperature of $a^2$ degrees, it closes the circuit of electro-magnet 15², which opens valve 16² and allows an additional amount of mash to flow in. When thermometer 20³, located in the lower part of the charge of shavings has reached the optimum temperature of $a^3$ degrees, it closes the circuit of electromagnet 15³, which opens valve 16³. For the third time, an additional amount of mash is thereby allowed to flow in. The generator is now operating fully and normally.

In order, however, in the case of a possible further increase of output, to carry still more heat away from the charge of shavings, contact thermometer 20⁴ is provided, which, if a maximum temperature of $a^4$ degrees is reached, actuates the fourth electro-magnet 15⁴ and valve 16⁴. Contact thermometer 20⁴ furthermore closes the circuit thermometer 19, in mash container 12². While heretofore, without regard for the number of electro-magnets 15¹ to 15³ shunted in, the infusion temperature has, by means of the thermometer 18, been kept at X°, thermometer 19 by actuating water valve 11 now reduces the infusion temperature by an adjustable quantity to $y°$. Hence, the generator in this condition of maximum output now receives not only a maximum of cooled infusion, but also an infusion at reduced temperature, so that the highest requirements for the removal of heat are met. If, upon starting operations one were to begin with a low infusion temperature $y°$, then this would have detrimental effects upon the fermentation process.

The number of contact thermometers in the charge of shavings and the number of electrovalves in container 12¹ may be changed as desired, as may also the number of contact thermometers in container 12² and the water valves which regulate the amount of water flowing into the cooler. The number of contact thermometers in the charge of shavings as 20⁴, which, in cooperation with 19, simultaneously regulate the inflow of mash and of water, may also be increased as desired. Further, it is possible by means of these members merely to effect regulation of the inflow of water, and, hence, to effect a reduction of the infusion temperature, without simultaneously changing the quantity of infusion.

The quantities flowing through valves 16⁰ to 16⁴ may be regulated as may be desired by the substitution of tubes, calibrated differently.

The level of the mash in container 12¹ may be also determined by means of a simple overflow pipe 21, that is, not by means of a float valve; the overflow pipe allows the mash, which is always pumped somewhat in excess, to flow back into collecting chamber 3 of the generator. But even when using float valve 14 this overflow pipe (in this case located somewhat higher) is advantageous, in that in case the float valve should not close, the excess quantity of mash conveyed, may flow back into the generator without loss.

The arrangement described may be adapted for automatic regulation of a current of an oxidizing gas, as air, in that, for example, contact thermometer 20⁴ opens an electrically operated air valve 22 when the maximum output has been reached which allows additional air to enter the vinegar generator.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. An apparatus for the manufacture of vinegar which comprises in combination, a generator, a path for circulating mash through said generator, including withdrawal from the base and introduction into the top thereof, said path for circulation of mash being provided with a mash-cooler and a container from which mash is introduced into the generator, a temperature-responsive element in said container whereby water flowing through the cooler is regulated in its amount through the actuation of a valve in a water line connected with said cooler.

2. Apparatus for the manufacture of vinegar as defined in claim 1, which includes in the combination an electro-magnetically actuated means positioned in the container whereby outflow of the mash into the generator is regulated, and a temperature-responsive element positioned in the generator whereby said electro-magnetic means is actuated.

3. Apparatus for the manufacture of vinegar as defined in claim 1, in which the combination includes a plurality of electro-magnetically actuated mash-valves positioned in the container whereby outflow of mash into the generator may be regulated, and a plurality of contact thermometers located at different heights in the generator whereby the electro-magnetic valves are actuated.

4. Apparatus for the manufacture of vinegar as defined in claim 1, in which the combination includes a temperature-responsive element positioned in the generator which by an electro-magnetic means actuates a mash-valve positioned in the container whereby outflow into the generator is regulated, and which also actuates a valve whereby a flow of water through the mash-cooler is regulated thus controlling the temperature of the mash.

5. Apparatus for the manufacture of vinegar as defined in claim 1, which includes in the combination a temperature-responsive element positioned in the generator and interconnected with a temperature-responsive element positioned in the container whereby regulation of the temperature of the mash may be effected without a regulation of the quantity of mash flowing into the generator.

6. An apparatus for the manufacture of vinegar as defined in claim 1, in which the combination includes a temperature-responsive element positioned in the generator and connected with an electro-magnetically actuated air-inlet valve whereby the current of air entering the generator may be regulated.

7. An apparatus for the manufacture of vinegar which comprises in combination a generator, a path for circulating mash through said generator including withdrawal from the base and introduction into the top thereof, said path for circulation of mash being provided with a mash cooler and a container from which mash is introduced into the generator, a plurality of electro-magnetically actuated mash valves positioned in the container whereby outflow of mash into the generator may be regulated, a plurality of temperature responsive elements located at different heights in the generator whereby said electro-magnetic valves are operated, a further temperature-responsive element positioned in the generator which by an electro-magnetic means actuates a mash valve positioned in the container and also actuates a valve whereby flow of water through a mash cooler is regulated, said element also being connected with an electro-magnetically actuated air inlet valve whereby air introduced into the generator may be regulated, and a temperature-responsive element in the container whereby water flowing through the cooler is regulated by actuation of a valve in a water line connected with said cooler.

8. An apparatus for the manufacture of vinegar which comprises in combination a generator, a path for circulating mash through said generator including withdrawal from the base and introduction into the top thereof, said path for circulation of mash being provided with a mash cooler and a container from which mash is introduced into the generator, a plurality of electro-magnetically actuated mash valves positioned in the container whereby outflow of mash into the generator may be regulated, a plurality of temperature responsive elements located at different heights in the generator whereby said electro-magnetic valves are operated, a further temperature-responsive element positioned in the generator which by an electro-magnetic means actuates a mash valve positioned in the container and also actuates a valve whereby flow of water through a mash cooler is regulated, said element also being connected with an electro-magnetically actuated air inlet valve whereby air introduced into the generator may be regulated, a temperature-responsive element in the container whereby water flowing through the cooler is regulated by actuation of a valve in a water line connected with said cooler, and a constant pressure reservoir for supplying water to said cooler.

9. In an apparatus for the manufacture of vinegar, the improvement which comprises in combination means positioned in a mash container whereby outflow of mash into a generator is regulated, and a temperature-responsive element positioned in said generator whereby said regulating means is actuated.

10. An apparatus for the manufacture of vinegar, which comprises in combination a generator, a path for circulating mash through said generator, including withdrawal from the base and introduction into the top thereof, said path for circulation of the mash being provided with a container from which mash is introduced into the generator in regulated amount, means positioned in the container whereby outflow of mash into the generator is regulated and a temperature-responsive element positioned in the generator whereby said regulating means is actuated.

11. An apparatus for the manufacture of vinegar, which comprises in combination a generator, a path for circulating mash through said generator, including withdrawal from the base and introduction into the top thereof, said path for circulation of the mash being provided with a container from which mash is introduced into the generator in regulated amount, electro-magnetically actuated means positioned in the container whereby outflow of mash into the generator is regulated and a temperature-responsive element positioned in the generator whereby said electro-magnetic means is actuated.

HEINRICH FRINGS.